United States Patent
Hebbar et al.

(10) Patent No.: US 11,589,156 B1
(45) Date of Patent: Feb. 21, 2023

(54) EXTERNALLY COUPLED LOUDSPEAKER ASSEMBLY WITH FLEXIBLE PORT

(71) Applicant: Harman International Industries, Incorporated, Stamford, CT (US)

(72) Inventors: Mahesh Hebbar, Northville, MI (US); Brian Sterling, Farmington Hills, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/504,572

(22) Filed: Oct. 19, 2021

(51) Int. Cl.
  *H04R 1/28* (2006.01)
  *H04R 1/02* (2006.01)
  *B60R 11/02* (2006.01)

(52) U.S. Cl.
  CPC ........ *H04R 1/2826* (2013.01); *B60R 11/0217* (2013.01); *H04R 1/023* (2013.01); *H04R 1/025* (2013.01); *H04R 2400/11* (2013.01); *H04R 2499/13* (2013.01)

(58) Field of Classification Search
  CPC ... H04R 1/2819; H04R 2499/13; F16L 33/03; F16L 33/035; F16L 37/098–0987
  See application file for complete search history.

(56) References Cited

U.S. PATENT DOCUMENTS

| | | | |
|---|---|---|---|
| 4,164,988 A * | 8/1979 | Virva | H04R 1/2857 181/155 |
| 9,288,561 B1 * | 3/2016 | Chu | H04R 1/2834 |
| 10,904,656 B2 | 1/2021 | Ludwig et al. | |
| 2004/0141625 A1 | 7/2004 | Leipold | |
| 2007/0215407 A1 * | 9/2007 | Chiang | H04R 1/2873 181/156 |
| 2009/0279733 A1 * | 11/2009 | Schuster | B60R 13/0237 381/389 |
| 2013/0336493 A1 | 12/2013 | Schild | |
| 2018/0251079 A1 * | 9/2018 | Negishi | H04R 5/02 |
| 2019/0182584 A1 * | 6/2019 | Ludwig | H04R 1/026 |
| 2019/0232883 A1 * | 8/2019 | Servadio | B60R 11/0217 |
| 2021/0204046 A1 | 7/2021 | Winton et al. | |

* cited by examiner

*Primary Examiner* — Mark Fischer
(74) *Attorney, Agent, or Firm* — Brooks Kushman P.C.

(57) ABSTRACT

A loudspeaker assembly for a vehicle includes a loudspeaker having a first side and an opposed second side, wherein the loudspeaker is configured to generate an acoustical signal having a front wave directed into an interior of the vehicle and a rear wave directed toward an exterior of the vehicle. The loudspeaker assembly further includes a coupler disposed on the second side of the loudspeaker, the coupler including an inlet portion for receiving the loudspeaker and an outlet portion. A flexible port is removably connectable to the coupler, the flexible port including an inlet end arranged to be connected to the outlet portion of the coupler, an outlet end arranged to be connected to an opening in an exterior body panel, and an elongated body extending between the inlet end and the outlet end, the flexible port configured to transmit the rear wave to the exterior of the vehicle.

19 Claims, 7 Drawing Sheets

EXTERNALLY COUPLED LOUDSPEAKER ASSEMBLY WITH FLEXIBLE PORT

TECHNICAL FIELD

Embodiments relate to a loudspeaker assembly with a flexible port for an externally coupled loudspeaker in a vehicle.

BACKGROUND

Automotive audio systems typically include several loudspeakers positioned in various locations within the interior of a vehicle, such as the passenger compartment or the trunk. Typical loudspeaker positions may include door panels or interior trim panels. Low-frequency loudspeakers, also known as woofers or subwoofers, are often located in the trunk, the rear panel shelf, under the rear seats, the chassis or in other frame elements of a vehicle.

In an externally coupled subwoofer (ECS), the loudspeaker housing may be omitted because the front and the back side of the loudspeaker are isolated from each other by a vehicle panel or frame element. In acoustical terms, an ECS configuration is referred to as an "infinite baffle", allowing optimized low frequency extension and maximized bandwidth, while simultaneously eliminating the requirement for a large sealed or vented-box subwoofer enclosure. This approach provides a very compact and weight efficient arrangement for audio inside the vehicle without sacrificing acoustical performance.

Typical ECS configurations include a metal or plastic frame which supports the loudspeaker, and a rear enclosure or acoustic coupler which connects to the frame and vents audio waves from the rear of the loudspeaker to the outside of the vehicle. Current implementations involve rigid plastic conduits for interfacing with an exterior vehicle body panel, where the rigid conduits are either molded as part of the acoustic coupler or assembled to the coupler by methods such as welding.

SUMMARY

In one or more embodiments, a loudspeaker assembly for a vehicle includes a loudspeaker having a first side and an opposed second side, wherein the loudspeaker is configured to generate an acoustical signal having a front wave directed into an interior of the vehicle and a rear wave directed toward an exterior of the vehicle. The loudspeaker assembly further includes a coupler disposed on the second side of the loudspeaker, the coupler including an inlet portion for receiving the loudspeaker and an outlet portion. A flexible port is removably connectable to the coupler, the flexible port including an inlet end arranged to be connected to the outlet portion of the coupler, an outlet end arranged to be connected to an opening in an exterior body panel, and an elongated body extending between the inlet end and the outlet end, the flexible port configured to transmit the rear wave to the exterior of the vehicle.

In one or more embodiments, the flexible port is compressible and expandable, and may have a corrugated configuration. The outlet portion of the coupler and the inlet end of the flexible port may each have a circular cross-section, and the outlet portion of the coupler and the loudspeaker may be arranged along a common axis. In one or more embodiments, one of the outlet portion of the coupler and the inlet end of the flexible port includes a plurality of spaced detents and the other includes a plurality of spaced apertures for receiving the plurality of spaced detents for removably attaching the flexible port to the coupler. The outlet end of the flexible port may include a flange spaced from a flexible tab, wherein the exterior body panel is received between the flange and the flexible tab to secure the flexible port to the exterior body panel. In one or more embodiments, the loudspeaker assembly may include a gasket arranged to be disposed between the outlet end of the flexible port and the exterior body panel, and may include a screen member arranged to be received on the outlet end of the flexible port.

In one or more embodiments, an externally coupled loudspeaker assembly for a vehicle includes a subwoofer mounted in an opening in an interior body panel and having a first side disposed toward an interior of the vehicle and an opposed second side, wherein subwoofer is configured to generate an acoustical signal having a front wave directed into the interior of the vehicle and a rear wave directed toward an exterior of the vehicle. A coupler is disposed on the second side of the subwoofer, the coupler including an inlet portion for receiving the subwoofer and an outlet portion, wherein the outlet portion of the coupler and the subwoofer are arranged along a common axis. A flexible port is removably connectable to the coupler, the flexible port including an inlet end arranged to be connected to the outlet portion of the coupler, an outlet end arranged to be connected to an opening in an exterior body panel, and an elongated body extending between the inlet end and the outlet end, wherein the flexible port is compressible and expandible and is configured to transmit the rear wave to the exterior of the vehicle.

In one or more embodiments, a method of installing a loudspeaker assembly in a vehicle includes providing a loudspeaker assembly, the loudspeaker assembly including a loudspeaker configured to generate an acoustical signal having a front wave directed into an interior of the vehicle and a rear wave directed toward an exterior of the vehicle, a coupler having an inlet portion and an outlet portion, and a flexible port having an inlet end, an outlet end, and an elongated body extending therebetween. The method further includes coupling the loudspeaker to the inlet portion of the coupler, removably connecting the inlet end of the flexible port to the outlet portion of the coupler, and removably connecting the outlet end of the flexible port to an opening in an exterior body panel to transmit the rear wave to the exterior of the vehicle.

In one or more embodiments, the inlet end of the flexible port may be connected along a first axis and the outlet end of the flexible port may be connected along a second axis offset from the first axis. The flexible port may have a corrugated configuration which is compressible and expandible during installation. The method may further include mounting the loudspeaker in an opening in an interior body panel of the vehicle, disposing a screen member on the outlet end of the flexible port, and disposing a gasket between the outlet end of the flexible port and the exterior body panel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
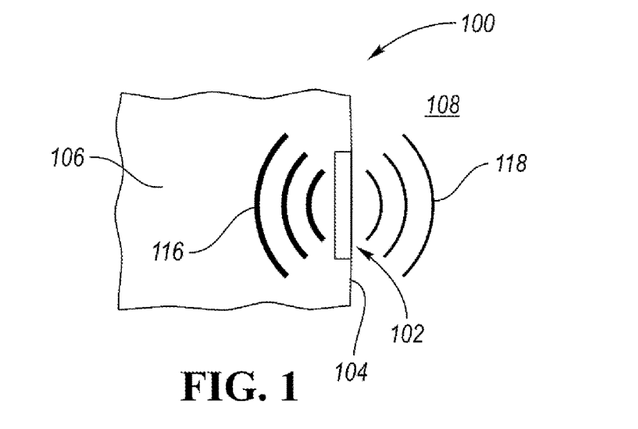
FIG. 1 is a schematic illustration of an externally coupled loudspeaker mounted in a baffle to generate a front sound wave into the interior of a vehicle and a rear sound wave to the exterior of the vehicle.

Referring first to FIG. 1, a schematic illustration of a vehicle 100 with a loudspeaker 102 mounted therein is shown. In this illustration, the loudspeaker 102 is arranged in a baffle 104, such as a vehicle body panel, which forms a barrier between the vehicle interior 106 and the vehicle exterior 108. The baffle 104 may include an opening or cavity in which the loudspeaker 102 is arranged. In one or more embodiments, the loudspeaker 102 may be a subwoofer or a woofer and may be part of an automotive audio system. It is understood that an automotive audio system may comprise several loudspeakers, although only one loudspeaker 102 is exemplarily illustrated herein.

Loudspeakers, such as subwoofers or woofers, that provide low-frequency sound require a large enclosure volume. In general, subwoofers generally emit sound between 20 Hz and 200 Hz, while traditional woofers generally emit sound between 40 Hz and 400 Hz. If the loudspeaker 102 is positioned in the frame or chassis of the vehicle 100 between the vehicle interior 106 and the vehicle exterior 108, an otherwise necessary loudspeaker housing may be omitted.

Figure 2:
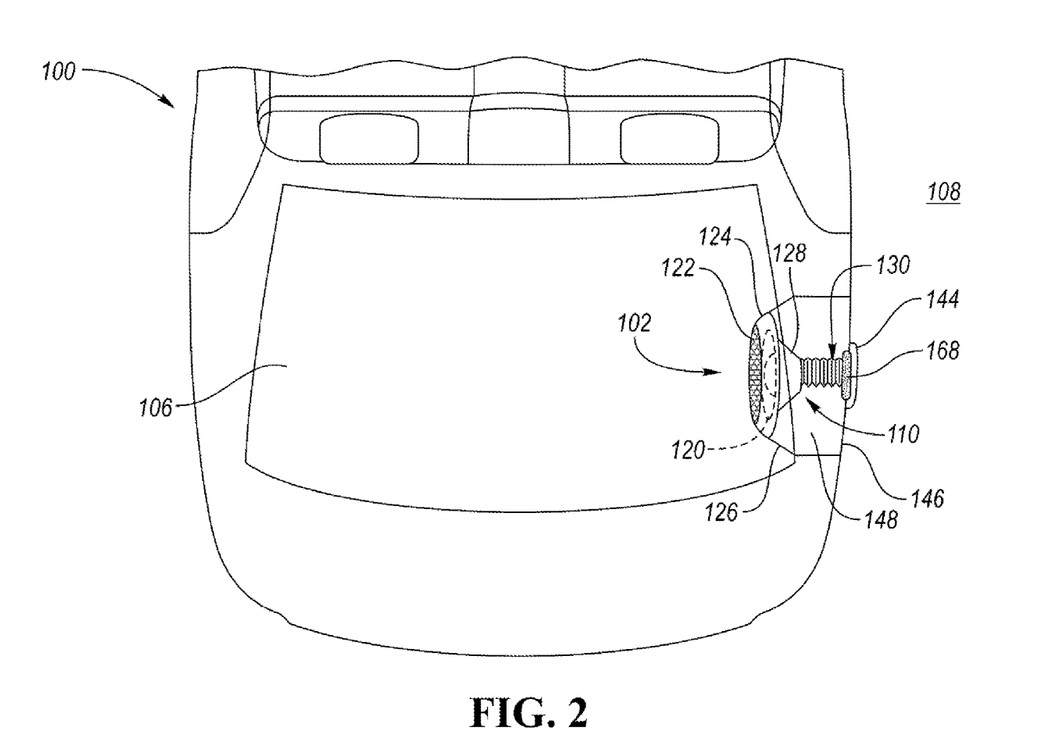
FIG. 2 is a schematic illustration of a vehicle showing a loudspeaker assembly according to one or more embodiments including a coupler and a flexible port connecting a second side of the loudspeaker to the exterior of the vehicle.
Figure 3:
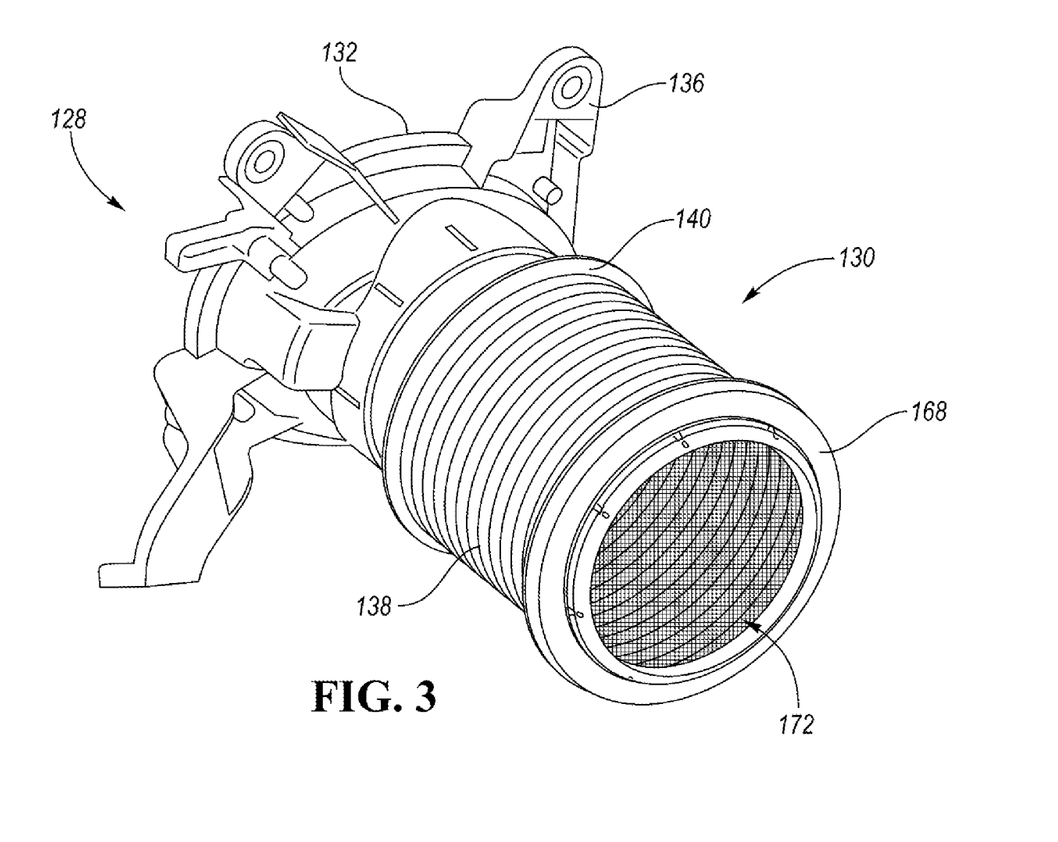
FIG. 3 is a perspective view of a coupler with an attached flexible port according to one or more embodiments.
Figure 4:
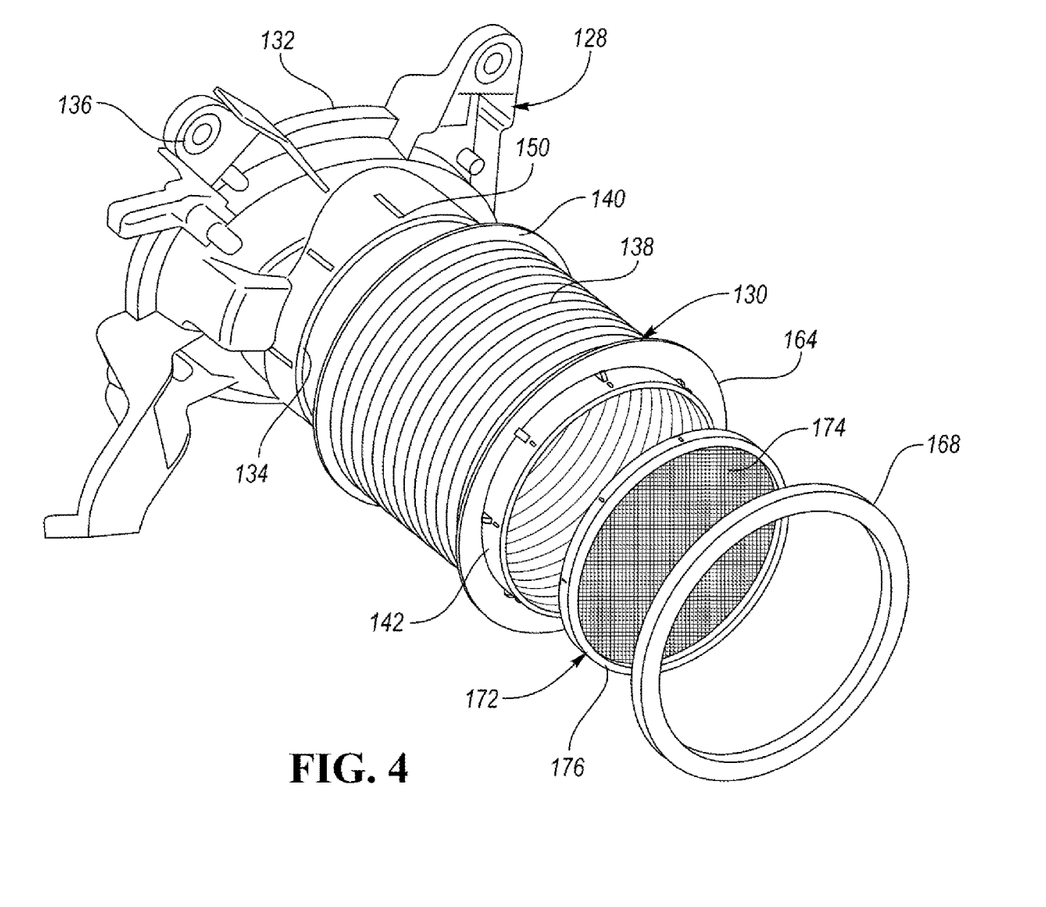
FIG. 4 is an exploded view of the coupler and flexible port of FIG. 3.

FIG. 2 illustrates an exemplary mounting position of a loudspeaker assembly 110 in a vehicle 100, such as in the trunk adjacent a rear quarter panel. While mounting of the loudspeaker assembly 110 is shown and described herein with respect to an automobile, it is understood that implementation of the loudspeaker assembly 110 in other types of vehicles is also fully contemplated.

The loudspeaker assembly 110 includes a loudspeaker 102 mounted in the vehicle 100, the loudspeaker 102 having a first side 112 facing the vehicle interior 106 and an opposed second side 114. The loudspeaker 102 is configured to generate an acoustical signal having a front wave 116 (FIG. 1) directed into the interior 106 of the vehicle 100 and a rear wave 118 (FIG. 1) directed away from the interior 106 of the vehicle 100 and toward the exterior 108 of the vehicle 100. The loudspeaker 102 includes a diaphragm or cone 120 for generating the front wave 116 and rear wave 118, wherein the cone 120 which may be formed of paper, paper composites/laminates, plastic such as polypropylene or mineral/fiber-filled polypropylene, or other suitable materials. An interior speaker grill 122 may cover the cone 120 at the first side 112 of the loudspeaker 102 and may be visible from the vehicle interior 106. The loudspeaker 102 may be mounted in a baffle, such as within an opening 124 in an interior body panel 126.

With continuing reference to FIG. 2 and also to FIGS. 3-6, the loudspeaker assembly 110 disclosed herein further includes a coupler 128 disposed on the second side 114 of the loudspeaker 102 and a flexible port 130 arranged to be attached to the coupler 128 and to extend toward the vehicle exterior 108. The coupler 128 and the flexible port 130 are in fluid communication with the vehicle exterior 108 and are arranged to transmit the rear wave 118 to the vehicle exterior 108 and external environment. The coupler 128 includes an inlet portion 132 disposed adjacent the second side 114 of the loudspeaker 102 and an outlet portion 134 arranged to be connected to the flexible port 130. The coupler 128 can be constructed from any suitable material, such as a plastic or metallic material.

Figure 5:
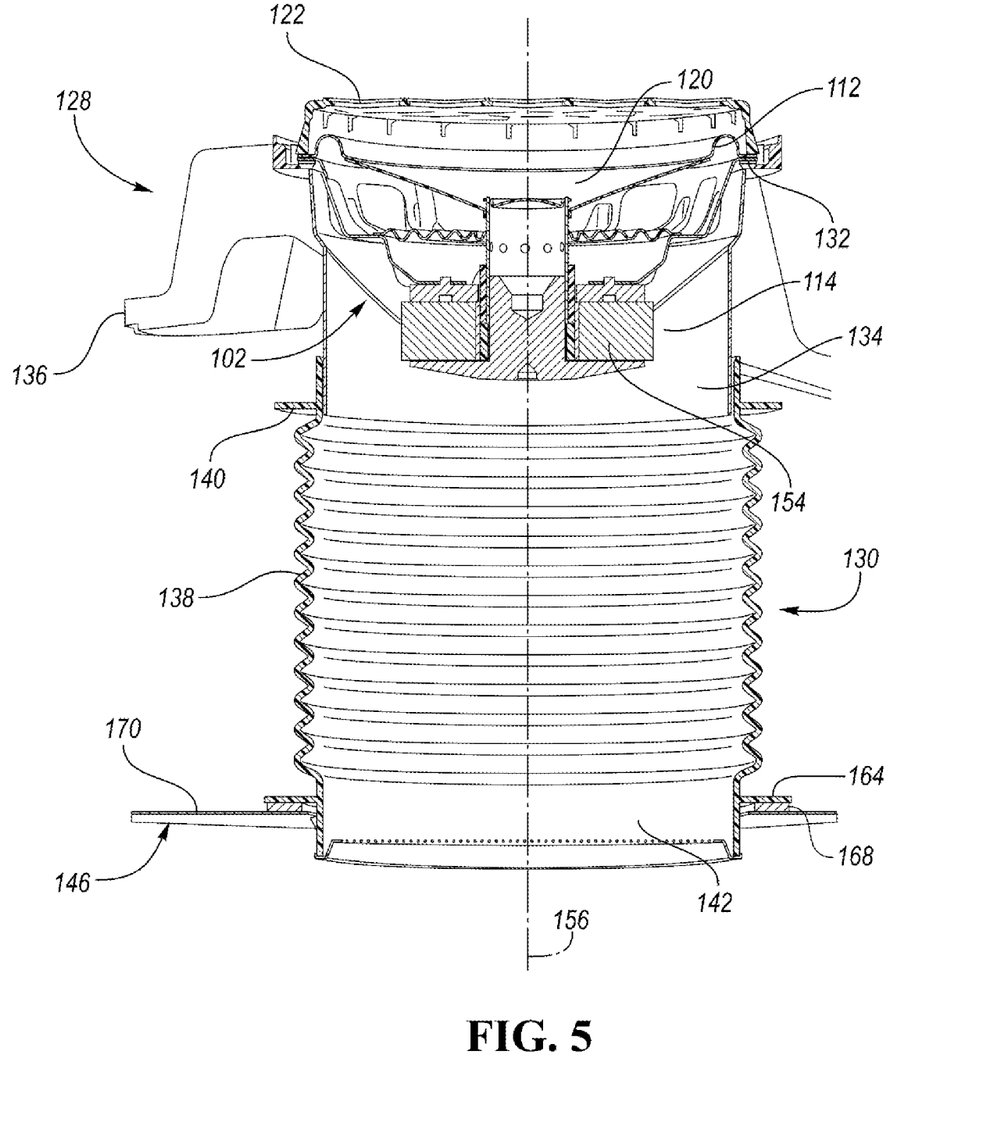
FIG. 5 is a cross-sectional view of the coupler and attached flexible port of FIG. 3.

FIG. 5 shows a cross-sectional view of a loudspeaker assembly 110 with a loudspeaker 102 attached to the inlet portion 132 of the coupler 128, wherein the inlet portion 132 may be fastened to the loudspeaker 102 or integrally formed therewith, for example. The inlet portion 132 may have a generally oval or circular configuration to correspond with a configuration of the loudspeaker 102, but other shapes are also contemplated. In one or more embodiments, the outlet portion 134 of the coupler 128 may have a circular cross-section. The coupler 128 may include one or more mounting arms 136 extending therefrom for fastening the coupler 128 to the interior body panel 126 or a frame element of the vehicle 100.

Referring again to FIGS. 2-6, the flexible port 130 has an elongated body 138 with an inlet end 140 arranged to be attached to the coupler outlet portion 134 and an outlet end 142 arranged to be attached to an opening 144 in an exterior body panel 146 of the vehicle 100 that is in fluid communication with the atmosphere. The opening 144 in the exterior body panel 146 may be provided in the rear quarter panel or wheel well of the vehicle 100, for example, or another suitable location. In an alternative embodiment, the opening 144 may be concealed or not easily visible from outside the vehicle 100, instead hidden under a body trim panel or other sheet metal while still in fluid communication with the ambient environment.

In one or more embodiments, the inlet end 140 and the outlet end 142 of the flexible port 130 may each have a smaller diameter than the elongated body 138. The flexible port 130 may have a generally circular cross-section as shown but is not limited to this configuration, and the cross-sectional area of the flexible port 130 may be constant or variable along its length. A cross-sectional area of the inlet end 140 may be larger than a cross-sectional area of the coupler outlet portion 134, so that the coupler outlet portion 134 may be at least partially received in the inlet end 140 as described below, but is not limited to this arrangement.

The flexible port 130 is constructed to be bendable, expandable, and compressible. In one or more embodiments, the flexible port 130, specifically the elongated body 138, may have a corrugated configuration and may include a single material layer or a plurality of layers. The flexible port 130 may be constructed from any suitable material such as, but not limited to, EPDM (ethylene propylene), neoprene, nitrile, silicone, or fluorocarbon. Optionally, one or more support brackets (not shown) could be provided within the internal space 148 between the interior body panel 126 and the exterior body panel 146 to support the flexible port 130 along its length, if desired.

Figure 9:
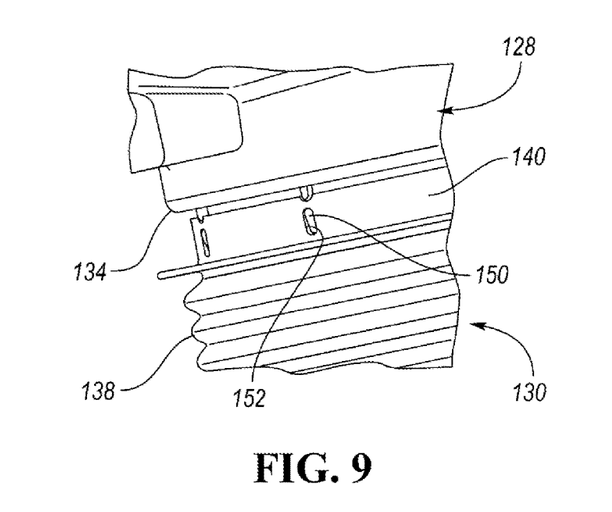
FIG. 9 is an enlarged perspective view of an attachment between the coupler and the flexible port according to one or more embodiments.
Figure 10:
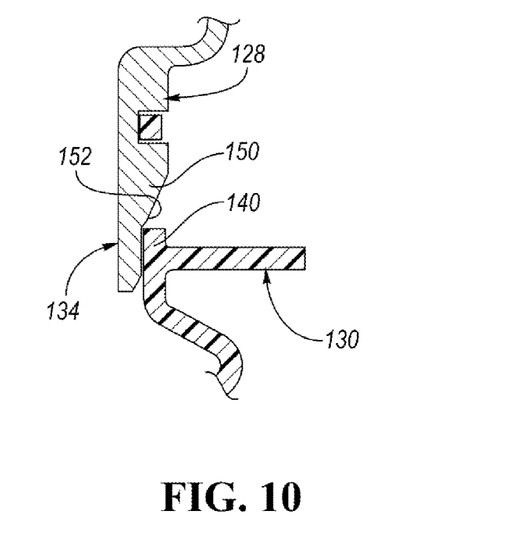
FIG. 10 is a cross-sectional view of the attached secured coupler and flexible port of FIG. 9.

The flexible port 130 may be easily and securely connected to the coupler 128, such as via press fit or slip on engagement. As best shown in FIGS. 9 and 10, the coupler outlet portion 134 may include a plurality of spaced detents 150 on an outer surface thereof. Correspondingly, the inlet end 140 of the flexible port 130 may include a plurality of spaced apertures 152 for receiving the detents 150 when the inlet end 140 is attached to and received on the coupler outlet portion 134. Of course, the inlet end 140 could alternatively include detents, such as on an inner surface thereof, and the coupler outlet portion 134 could include apertures for coupling the flexible port 130 to the coupler 128. In other embodiments, the inlet end 140 could be attached to the coupler outlet portion 134 via adhesives, fasteners, welding, or other means, or the flexible port 130 could be formed as a single piece with the coupler 128.

When the second side 114 of the loudspeaker 102 is in fluid communication with the atmosphere on the exterior 108 of the vehicle 100 via the flexible port 130, the loudspeaker 102 is considered to have an infinite baffle. Undesirable resonances in the loudspeaker 102 may be reduced because sound waves emitted from the second side 114 of the loudspeaker 102 are prevented from entering the vehicle interior 106 and thus do not interfere with sound waves emitted from the first side 112 of the loudspeaker 102. Additionally, another benefit of the open environment, or infinite baffle, is that strain in the cone 120 is reduced because the second side 114 of the loudspeaker 102 vents to the outside atmosphere. As a result, the loudspeaker 102 may produce a higher sound pressure level (SPL) at low frequency ranges in the vehicle interior 106.

The dimensions of the coupler 128 and the flexible port 130 may be selected to be proportional to the size and parameters of the loudspeaker 102. In one or more embodiments, it is desirable for the volume of the coupler 128 and the flexible port 130 to be minimized, the cross-sectional area of the coupler 128 and the flexible port 130 to be maximized, and the length of the coupler 128 and the flexible port 130 (from the second side 114 of the loudspeaker 102 to the exterior body panel 146) to be minimized. These parameters may be selected to reinforce the idealized infinite baffle condition, which would be a coupler 128 and flexible port 130 of zero volume, zero length and the same cross-sectional area as the cone 120 of the loudspeaker 102. In one or more embodiments, the volume and the length of the flexible port 130 may be manipulated to adjust and control the tuning frequency of the loudspeaker assembly 110.

While particular configurations of the coupler 128 and flexible port 130 are shown and described herein, it is understood that the coupler 128 and the flexible port 130 are not limited to these configurations, and that other geometries, lengths, and areas of these components are contemplated and may be selected to optimize transmission of the acoustical signal to the interior 106 of a specific vehicle 100.

In current ECS implementations, especially when the coupler and port components are rigid and integrally molded together, an axis of the coupler outlet portion 134 often must be offset from an axis of the loudspeaker 102 and its motor 154 (FIG. 5) in order for the rigid coupler and port to be capable of spanning the distance and trajectory between the opening 124 in the interior body panel 126 and the opening 144 in the exterior body panel 146, as well as any obstructions in the internal space 148 between the interior and exterior body panels 126, 146. In addition, the outlet portion axis may be located at different locations and angles with respect to the loudspeaker or motor axis for different programs based on vehicle level packaging. Without axis alignment, an imbalance of the forces acting on the cone 120 can occur due to unequal air pressure during operation of the loudspeaker 102, which can cause the cone 120 to tilt and rock instead of moving perpendicular to the motor axis, in turn causing rubbing of the voice coil against the stationary parts of the motor 154 and generating extraneous noise.

For optimum acoustic performance, it is preferable for the outlet portion 134 and the loudspeaker 102 and its motor 154 to be aligned along a common axis 156 such that the flexible port 130 will also be aligned along the common axis 156, as is depicted in FIG. 5 for the coupler 128 and flexible port 130 disclosed herein. The flexible port 130 can accommodate any offset, angle, or obstacles between the coupler 128 and the opening 144 in the exterior body panel 146, such that the coupler outlet portion 134 can always be aligned with the motor 154 along the common axis 156, regardless of speaker type. Accordingly, all couplers 128 may have a standard location of the outlet portion 134 (and connection of the flexible port 130) which are coaxial with the motor 154.

Figure 6:
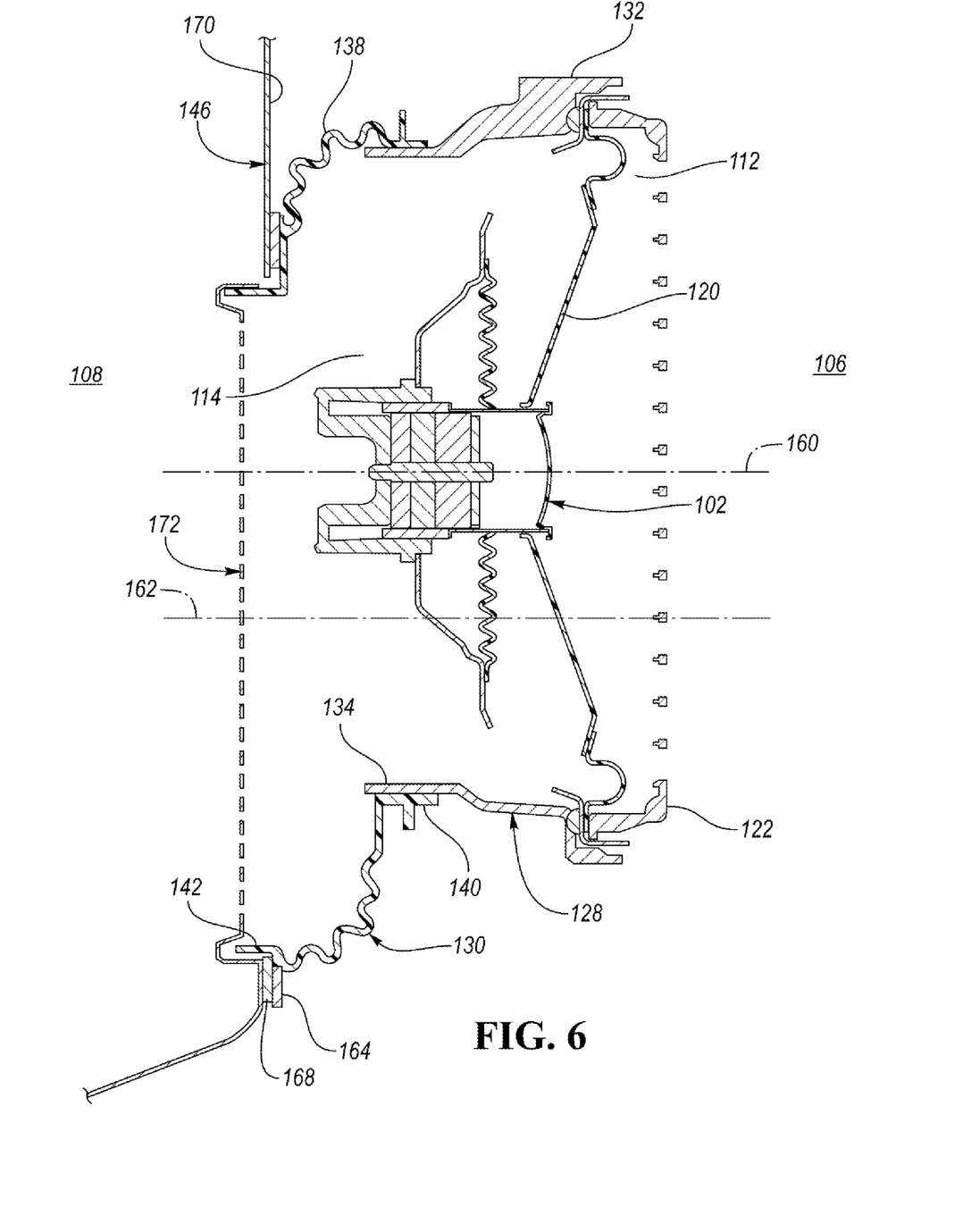
FIG. 6 is a schematic, cross-sectional view of an exemplary installed configuration of a coupler and flexible port according to one or more embodiments.
Figures 7, 8:
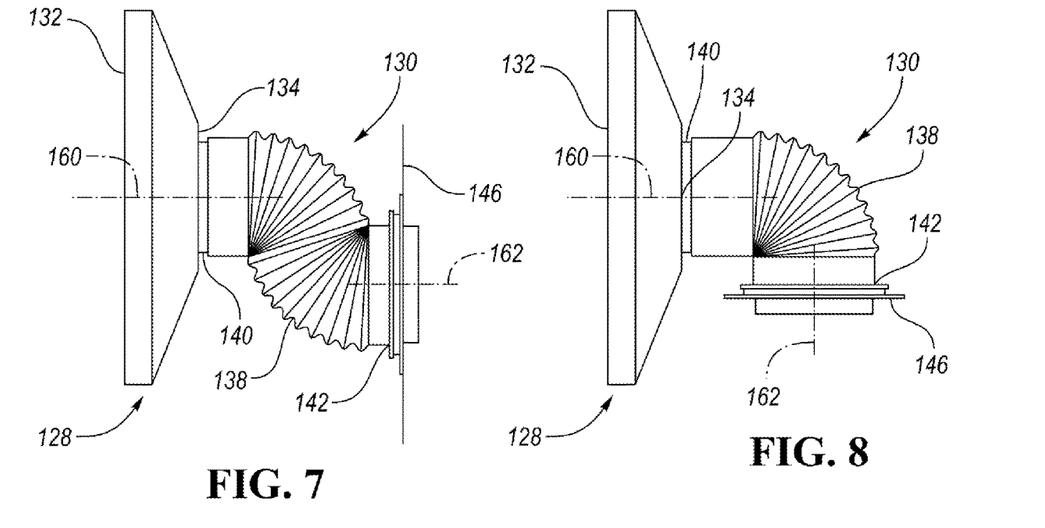
FIG. 7 is a schematic illustration of an exemplary location of a coupler and port inlet end along a first axis with respect to a second axis of a port outlet end and an exterior body panel opening according to one or more embodiments.
FIG. 8 is a schematic illustration of another exemplary location of a coupler and port inlet end and exterior body panel opening according to one or more embodiments.

Depending upon the mounting location within the vehicle 100, it may be desirable to have the opening 124 in the interior body panel 126 positioned in a location that is not vertically and/or horizontally aligned with a location of the opening 144 in the exterior body panel 146. With reference to FIGS. 6-8, the flexible port 130 disclosed herein allows an offset or angle between the interior body panel opening 124 and the exterior body panel opening 144. As shown, the inlet end 140 of the flexible port 130 may be arranged along a first axis 160 (e.g., the common axis 156) and the outlet end 142 of the flexible port 130 may be arranged along a second axis 162, wherein the second axis 162 is offset from the first axis 160.

The flexible port 130 disclosed herein can be configured to have a standard size and shape of the elongated body 138, the inlet end 140, and the outlet end 142. Furthermore, the flexible port 130 can be utilized for different distances between the interior body panel 126 and the exterior body panel 146 as well as different offsets between the first axis 160 and the second axis 162 of the of the openings 124, 144, and thus is compatible with multiple vehicle programs. As such, a standard part can be created instead of having to customize a different flexible port 130 for each different speaker and/or vehicle.

The modularity of the flexible port 130 also allows the placement of the interior body panel opening 124 and the exterior body panel opening 144 to be optimized. The customer (OEM) will have requirements for the desired placement of the openings 124, 144, where the placement for each opening 124, 144 may not align along the same axis as described above. Since the flexible port 130 disclosed herein can accommodate the offset placement of the openings 124, 144, the customer is provided with more freedom to place the openings 124, 144 with both function and aesthetics in mind.

In current ECS coupler and port configurations where these parts are injection molded as a unitary structure, undercut port shapes such as the examples illustrated in FIGS. 7 and 8 would not be possible, as these shapes would cause a die lock condition or require assistance to remove the part from the mold. The flexible port 130 disclosed herein advantageously can form complex curved configurations, and thus is more versatile than previous rigid molded parts.

Figure 13:
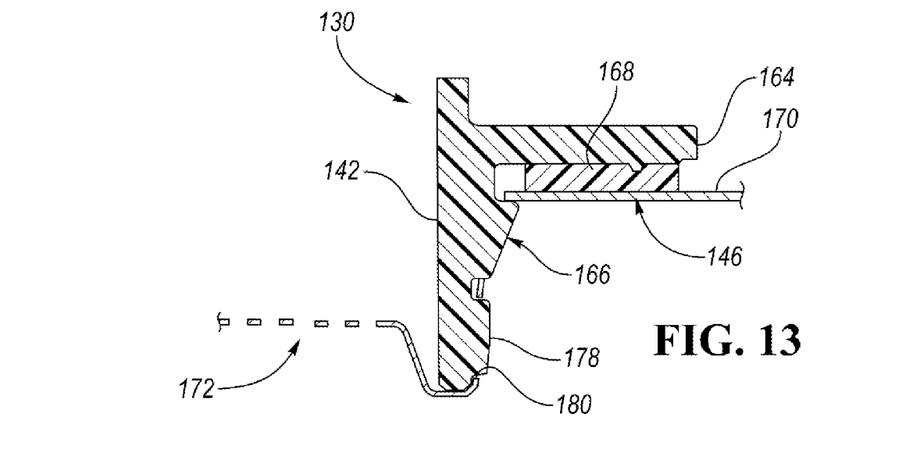
FIG. 13 is a cross-sectional view of the flexible port secured to an external vehicle panel and incorporating a gasket.

In order to ensure that water from the outside environment does not enter the vehicle interior 106, it is desired that the interface between the outlet end 142 of the flexible port 130 and the exterior body panel 146 be water tight. As shown in FIG. 13, the outlet end 142 may include a flange 164 spaced from a flexible tab 166. In one or more embodiments, the outlet end 142 may be mounted to the exterior body panel 146 by inserting the outlet end 142 through the exterior body panel opening 144 from the internal space 148 between the interior and exterior body panels 126, 146, such that the flexible tab 166 moves past the exterior body panel 146 and captures the exterior body panel 146 between the tab 166 and the flange 164. An annular gasket 168 may be coupled to an underside of the flange 164, may be coupled to an inner surface 170 of the exterior body panel 146, or otherwise inserted between the flange 164 and the inner surface 170 of the exterior body panel 146. The gasket 168 may be constructed, for example, from a PVC foam material or other suitable material which can provide a water tight seal with the exterior body panel 146 as well as be capable of compression.

In prior ECS systems with rigid parts, dimensional variations in the vehicle due to tolerance stack up of the components could not be easily accommodated and might result in non-uniform gasket compression, potential water leak concerns due to a deficiency of the seal provided by the gasket, and/or potential no-build conditions. The flexible port 130 disclosed herein will forgive such component dimensional variations, providing a uniform and standard compression of the gasket 168 regardless of vehicle tolerances.

The flexible port 130 allows for easier assembly of components of the loudspeaker assembly 110 as compared with current ECS systems in which components are integrally formed or welded together. Because the flexible port 130 is a separate component from the coupler 128 and can bend, twist, expand and compress, installation is greatly facilitated. In one or more embodiments, the outlet end 142 of the flexible port 130 may first be mounted to the exterior body panel 146, and subsequently the inlet end 140 of the flexible port 130 may be mounted to the coupler 128, such as by extending the inlet end 140 through the opening 124 in the interior body panel 126, after which the loudspeaker 102 (and coupler 128) can be mounted to the interior body panel 126. This sequence has the advantage of eliminating the need to install components in the confined internal space 148 between the interior body panel 126 and the exterior body panel 146, and is made possible by the flexible nature of the port 130. For example, during the installation process, the flexible port 130 can be stretched or expanded to attach the port 130 between the coupler 128 and the exterior body panel 146, and when installation is complete the flexible port 130 can compress or return to a resting length.

Figure 11:
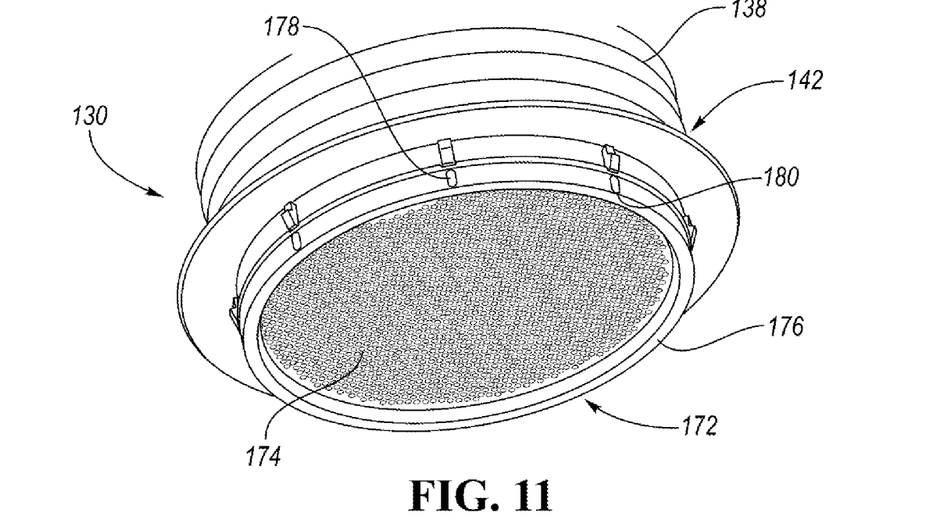
FIG. 11 is an enlarged perspective view of an attachment between the flexible port and a screen member according to one or more embodiments.
Figure 12:
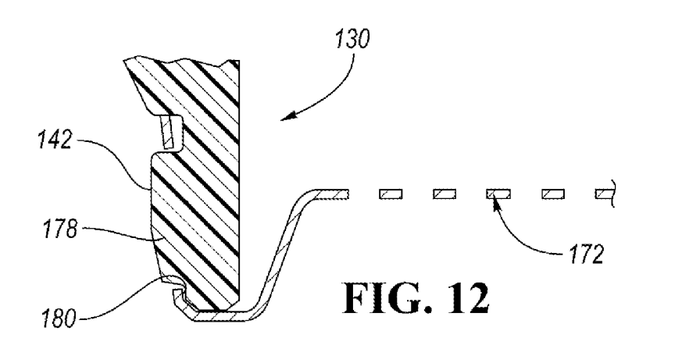
FIG. 12 is a cross-sectional view of the attached flexible port and screen member of FIG. 11.

The outlet end 142 of the flexible port 130 may be arranged to receive a screen member 172, as shown in FIGS. 11 and 12. The screen member 172 may be generally circular and includes a mesh material 174 (metal or another suitable material) surrounded by an outer rim 176. The screen member 172 is sized to be received on the outlet end 142 of the flexible port 130, where the outlet end 142 includes a plurality of spaced detents 178 on an outer surface thereof. Correspondingly, the outer rim 176 of the screen member 172 may include a plurality of spaced apertures 180 for receiving the detents 178 when the screen member 172 is attached to the outlet end 142. Of course, the screen member 172 could alternatively include detents 178, such as on an inner surface thereof, and the outlet end 142 of the flexible port 130 could include apertures 180 for coupling the screen member 172 to the outlet end 142, or the screen member 172 and the outlet end 142 could be coupled by other means. Advantageously, the screen member 172 can be assembled to the outlet end 142 of the flexible port 130 without requiring insert molding or heat staking.

The screen member 172 may function as an exterior grill, and/or a noise, vibration and harshness (NVH) (acoustic resistive) material, and/or a weather shielding material, as well as for preventing animals (e.g., rodents) from nesting inside the flexible port 130 or coupler 128. In an NVH capacity, the screen member 172 may provide noise isolation from the outside atmosphere while allowing fluid communication between the loudspeaker 102 and the outside environment, reducing unwanted resonance and minimizing or preventing outside noise from entering the vehicle 100. In a weather shielding capacity, the screen member 172 can also protect the second side 114 of the loudspeaker 102 from being exposed to environmental weathering, which can present a problem during extreme conditions such as water, snow, ice, heat, or particulates (mud, dirt, rocks). Separate NVH and/or weather shielding materials integrated with or separate from the screen member 172 are also contemplated. With use of a standard-sized flexible port 130 disclosed herein for different loudspeakers 102 and vehicles 100 as described above, both the screen member 172 and the gasket 168 may also be standardized for all loudspeaker assemblies 110.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A loudspeaker assembly for a vehicle, comprising:
a loudspeaker having a first side and an opposed second side, wherein the loudspeaker is configured to generate an acoustical signal having a front wave directed into an interior of the vehicle and a rear wave directed toward an exterior of the vehicle;
a coupler disposed on the second side of the loudspeaker, the coupler including an inlet portion for receiving the loudspeaker and an outlet portion; and
a flexible port removably connectable to the coupler, the flexible port including an inlet end arranged to be connected to the outlet portion of the coupler, an outlet end arranged to be connected to an opening in an exterior body panel, and an elongated body extending between the inlet end and the outlet end, the flexible port configured to transmit the rear wave to the exterior of the vehicle, wherein one of the outlet portion of the coupler and the inlet end of the flexible port includes a plurality of spaced detents and the other includes a plurality of spaced apertures for receiving the plurality of spaced detents for removably attaching the flexible port to the coupler.

2. The loudspeaker assembly of claim 1, wherein the flexible port is compressible and expandable.

3. The loudspeaker assembly of claim 1, wherein the flexible port has a corrugated configuration.

4. The loudspeaker assembly of claim 1, wherein the outlet portion of the coupler and the inlet end of the flexible port each have a circular cross-section.

5. The loudspeaker assembly of claim 1, wherein the outlet portion of the coupler and the loudspeaker are arranged along a common axis.

6. The loudspeaker assembly of claim 1, further comprising a gasket arranged to be disposed between the outlet end of the flexible port and the exterior body panel.

7. The loudspeaker assembly of claim 1, further comprising a screen member arranged to be received on the outlet end of the flexible port.

8. A loudspeaker assembly for a vehicle, comprising:
a loudspeaker having a first side and an opposed second side, wherein the loudspeaker is configured to generate an acoustical signal having a front wave directed into an interior of the vehicle and a rear wave directed toward an exterior of the vehicle;
a coupler disposed on the second side of the loudspeaker, the coupler including an inlet portion for receiving the loudspeaker and an outlet portion; and
a flexible port removably connectable to the coupler, the flexible port including an inlet end arranged to be connected to the outlet portion of the coupler, an outlet end arranged to be connected to an opening in an exterior body panel, and an elongated body extending between the inlet end and the outlet end, the flexible port configured to transmit the rear wave to the exterior of the vehicle,
wherein the outlet end of the flexible port includes a flange spaced from a flexible tab, wherein the exterior body panel is received between the flange and the flexible tab to secure the flexible port to the exterior body panel.

9. The loudspeaker assembly of claim 8, wherein the flexible port has a corrugated configuration.

10. The loudspeaker assembly of claim 8, wherein the outlet portion of the coupler and the inlet end of the flexible port each have a circular cross-section.

11. The loudspeaker assembly of claim 8, further comprising a gasket arranged to be disposed between the outlet end of the flexible port and the exterior body panel.

12. The loudspeaker assembly of claim 8, further comprising a screen member arranged to be received on the outlet end of the flexible port.

13. The loudspeaker assembly of claim 8, wherein the flexible port is compressible and expandable.

14. The loudspeaker assembly of claim 8, wherein the outlet portion of the coupler and the loudspeaker are arranged along a common axis.

15. A method of installing a loudspeaker assembly in a vehicle, the method comprising:
providing a loudspeaker assembly, the loudspeaker assembly including a loudspeaker configured to generate an acoustical signal having a front wave directed into an interior of the vehicle and a rear wave directed toward an exterior of the vehicle, a coupler having an inlet portion and an outlet portion, and a flexible port having an inlet end, an outlet end, and an elongated body extending therebetween, wherein one of the outlet portion of the coupler and the inlet end of the flexible port includes a plurality of spaced detents and the other includes a plurality of spaced apertures for receiving the plurality of spaced detents;
coupling the loudspeaker to the inlet portion of the coupler;
removably connecting the inlet end of the flexible port to the outlet portion of the coupler via the detents and the apertures; and
removably connecting the outlet end of the flexible port to an opening in an exterior body panel to transmit the rear wave to the exterior of the vehicle.

16. The method of claim 15, wherein the inlet end of the flexible port is connected along a first axis and the outlet end of the flexible port is connected along a second axis offset from the first axis.

17. The method of claim 15, wherein the flexible port has a corrugated configuration which is compressible and expandible during installation.

18. The method of claim 15, further comprising mounting the loudspeaker in an opening in an interior body panel of the vehicle, disposing a screen member on the outlet end of the flexible port, and disposing a gasket between the outlet end of the flexible port and the exterior body panel.

19. The method of claim 15, wherein the outlet end of the flexible port includes a flange spaced from a flexible tab, and removably connecting the outlet end includes receiving the exterior body panel between the flange and the flexible tab.

* * * * *